(12) United States Patent
Gkoulalas-Divanis

(10) Patent No.: US 11,003,795 B2
(45) Date of Patent: *May 11, 2021

(54) IDENTIFICATION OF OPTIMAL DATA UTILITY-PRESERVING ANONYMIZATION TECHNIQUES BY EVALUATION OF A PLURALITY OF ANONYMIZATION TECHNIQUES ON SAMPLE DATA SETS THAT CORRESPOND TO DIFFERENT ANONYMIZATION CATEGORIES

(71) Applicant: International Business Machines Corporation, Armonk, NY (US)

(72) Inventor: Aris Gkoulalas-Divanis, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,134

(22) Filed: Jun. 18, 2019

(65) Prior Publication Data
US 2019/0303616 A1 Oct. 3, 2019

Related U.S. Application Data

(63) Continuation of application No. 15/902,181, filed on Feb. 22, 2018.

(51) Int. Cl.
*G06F 21/62* (2013.01)
*G06F 16/28* (2019.01)

(52) U.S. Cl.
CPC ........ *G06F 21/6254* (2013.01); *G06F 16/285* (2019.01)

(58) Field of Classification Search
CPC ............................ G06F 21/6254; G06F 16/285
See application file for complete search history.

(56) References Cited

U.S. PATENT DOCUMENTS 9,129,133 B2    9/2015  LaFever et al.
2014/0380489 A1* 12/2014  Hacid ................ G06F 21/6254
                                                      726/26

(Continued)

FOREIGN PATENT DOCUMENTS

CN         104732154 A      6/2015

OTHER PUBLICATIONS

Disclosed Anonymously, "A Method Uses Dynamic Anonymization to Protect Customer Sensitive Data During Analytics", IPCOM000249015D, Jan. 26, 2017, 7 pages.

(Continued)

*Primary Examiner* — Brian F Shaw
(74) *Attorney, Agent, or Firm* — Will Stock; Edell, Shapiro & Finnan, LLC

(57) ABSTRACT

Systems, methods and computer readable media are provided herein for de-identification of a dataset. Each of a plurality of anonymization techniques are assigned to a corresponding one of a plurality of anonymization categories, with each anonymization category corresponding to particular types of operations applied by the anonymization techniques. A sample dataset is generated from the dataset for each anonymization category based on a sampling technique associated with that anonymization category, wherein the sampling technique is selected based on a particular category of anonymization techniques. Each anonymization technique is applied to the sample dataset corresponding to the anonymization category assigned for the anonymization technique, and each anonymization technique is evaluated with respect to data utility based on a utility of the anonymized sample data produced. An anonymization technique is selected for de-identifying the dataset based on the evaluation and the selected anonymization technique is applied to de-identify the dataset.

10 Claims, 7 Drawing Sheets

(56) References Cited

U.S. PATENT DOCUMENTS

| | | | |
|---|---|---|---|
| 2015/0347624 A1 | 12/2015 | Villars | |
| 2016/0154978 A1 | 6/2016 | Baker et al. | |
| 2017/0124351 A1 | 5/2017 | Scaiano et al. | |
| 2018/0004978 A1* | 1/2018 | Hebert | G06F 21/6254 |
| 2019/0258824 A1 | 8/2019 | Gkoulalas-Divanis | |

OTHER PUBLICATIONS

Disclosed Anonymously, "A Risk Management Framework for Securely Sharing Anonymized Data While Preserving Individual Privacy", IPCOM000204564D, Mar. 3, 2011, 3 pages.

Disclosed Anonymously, "Secret Relations Between Data to Protect Sensitive Data", IPCOM000230160D, Aug. 23, 2013, 6 pages.

Gkoulalas-Divanis et al., "Medical Data Sharing: Privacy Challenges and Solutions", ECML/PKDD, Athens, Sep. 2011, 175 pages.

Terrovitis, et al., "Privacy-preserving Anonymization of Set-valued Data" PVLDB 1(1), Auckland, Aug. 2008, p. 115-125.

List of IBM Patents or Patent Applications Treated as Related, filed Jun. 18, 2019.

A. Gkoulalas-Divanis, et al., "Anonymization of Electronic Medical Records to Support Clinical Analysis", SpringerBriefs, Jun. 22, 2012, 90 pages.

A. Gkoulalas-Divanis, et al., "Medical Data Privacy Handbook", Springer, ISBN 978-3-319-23632-2, 2015, 23 pages.

G. Loukides, et al., "Utility-preserving transaction data anonymization with low information loss", Expert Systems with Applications 39 (2012) 9764-9777, 2012, 14 pages.

A. Gkoulalas-Divanis, et al., "Introduction to Medical Data Privacy", in Medical Data Privacy Handbook, Springer, 2015, 14 pages.

G. Loukides, et al., "Utility-Aware Anonymization of Diagnosis Codes", IEEE Journal of Biomedical and Health Informatics, vol. 17, No. 1, Jan. 2013, 11 pages.

G. Poulis, et al., "Anonymizing datasets with demographics and diagnosis codes in the presence of utility constraints", Journal of Biomedical Informatics 65 (2017) 76-96, 2017, 21 pages.

G. Loukides, et al., "Hiding Sensitive Patterns from Sequence Databases: Research Challenges and Solutions", 2013 IEEE 14th International Conference on Mobile Data Management, 2013, 6 pages.

A. Gkoulalas-Divanis, et al., "Utility-guided Clustering-based Transaction Data Anonymization", Transactions on Data Privacy 5 (2012) 223-251, 2012, 29 pages.

A. Gkoulalas-Divanis, et al., "Anonymization of Electronic Medical Records to Support Clinical Analysis", SpringerBriefs, ISBN 978-1-4614-5667-4, 2013, 87 pages.

* cited by examiner

IDENTIFICATION OF OPTIMAL DATA UTILITY-PRESERVING ANONYMIZATION TECHNIQUES BY EVALUATION OF A PLURALITY OF ANONYMIZATION TECHNIQUES ON SAMPLE DATA SETS THAT CORRESPOND TO DIFFERENT ANONYMIZATION CATEGORIES

BACKGROUND

1. Technical Field

Present invention embodiments relate to data de-identification, and more specifically, to determining data anonymization techniques that achieve optimal data utility for a set of data, by evaluating a plurality of data anonymization techniques on potentially different sample datasets of the data, wherein the sample datasets are generated according to rules for particular anonymization categories.

2. Discussion of the Related Art

Data anonymization is the process of protecting personally identifiable information in datasets, including both direct and indirect (or quasi) identifiers, in such a way that the information remaining in the dataset cannot be used to re-identify the individuals. Direct identifiers include a full name of an individual, an address, a phone number, a social security number, a patient identifier, etc. Data anonymization techniques aim to protect indirect, or quasi, identifiers in a dataset as well, for example, using data generalization and/or data suppression techniques, usually following a formal privacy model such as k-anonymity, l-diversity, km-anonymity, set-based anonymization, RT-anonymization, etc. Quasi-identifiers are attributes in a dataset whose values alone are not sufficient to allow for re-identification of an individual, as part of data privacy attacks, but when used in combination such identifiers may allow for re-identification of individuals. For example, with respect to individuals working for a particular company, by combining a location, an age, and a gender, the identity of an individual may be uniquely determined. Another example regards the combination of a five-digit zip code, a gender, and a date-of-birth for an individual, which has been shown to be unique for a large number of United States citizens.

While numerous techniques exist for processing quasi-identifiers following formal privacy models, such as k-anonymity and l-diversity, it is difficult when given a dataset to select an optimal anonymization technique for anonymizing the dataset in an efficient manner. For example, a set of data anonymization techniques ($A_1 \ldots A_n$) may each aim to enforce the same privacy model with respect to a dataset D, however, given the different data transformations that each anonymization technique applies to the dataset, it is not clear which of the data anonymization techniques provide optimal data utility.

Data anonymization techniques may be assessed as a function of data utility. Data utility may be measured using information loss metrics, which capture the overall distortion introduced to a dataset due to the data transformations made to anonymize the data, and using workload-aware utility loss metrics to quantify how well the anonymized data can support a specific workload (e.g., in terms of data clustering, data classification, aggregate count query answering, etc.) as compared to the original data. For example, a technique that least generalizes or suppresses values in the dataset may be desired to maximize the utility of the data.

Maintaining high data utility with regard to the anonymized data is needed in data anonymization tasks. However, utility-preserving data anonymization techniques often have high computational complexity, and therefore, often incur high computational costs in terms of the amount of time needed to process and anonymize a dataset. Computational costs may further increase when these techniques are applied to large volumes of data, typically generated on a daily basis in various business sectors, such as in healthcare, wherein data may need to be anonymized in order to support a secondary purpose or to support a particular use case. Retaining data utility in data anonymization may lead to complex calculations performed by data anonymization techniques in order to select one technique over other techniques for a dataset, which makes such techniques computationally costly.

Moreover, depending on the original data distribution as well as on the workload that the anonymized data will need to support, some data anonymization techniques may provide superior utility-preservation as compared to other data anonymization techniques. However, the optimal anonymization technique or set of optimal techniques for a dataset and workload, is not known a priori, making evaluation of these anonymization techniques on the data lengthy and time consuming. For example, anonymization techniques may take hours or days in state-of-the-art computing systems to compute for a dataset D, even if executed in parallel, and evaluating a dataset D with each anonymization technique, among a plurality of available anonymization techniques, to determine which technique maintains high data utility is often impractical. Further, some anonymization techniques support multiple configuration options and, thus, multiple settings for these configurations may need to be evaluated for a given anonymization technique in order to determine the best overall solution (i.e. anonymization technique and configuration options) for a given dataset. Thus, identifying an optimal technique is often computationally expensive in terms of time and resources, if even performed at all.

SUMMARY

According to embodiments of the present invention, systems, methods and computer readable media are provided for de-identification of a dataset. Each of a plurality of anonymization techniques are assigned to a corresponding one of a plurality of anonymization categories, with each anonymization category corresponding to particular types of operations applied by the anonymization techniques in order to de-identify the dataset. A sample dataset is generated from the dataset for each anonymization category based on a sampling technique associated with that anonymization category, wherein the sampling technique is selected based on a particular category of anonymization techniques. Each anonymization technique is applied to the sample dataset corresponding to the anonymization category assigned for the anonymization technique, and each anonymization technique is evaluated with respect to data utility based on a utility of the anonymized sample data produced. An anonymization technique is selected for de-identifying the dataset based on the evaluation and the selected anonymization technique is applied to de-identify the dataset.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components. Through the more detailed description of some embodiments of the present disclosure in the accompanying drawings, the above and other features and advantages of the present disclosure will become more apparent.

DETAILED DESCRIPTION

According to embodiments of the present invention, systems, methods and computer readable media are provided herein for selecting an anonymization technique from a plurality of anonymization techniques in order to de-identify a dataset. Given a set of data anonymization techniques ($A_1 \ldots A_n$), a dataset D, and a data utility function $U(A_i, D)$, the techniques provided herein may be utilized to identify which data anonymization technique ($A_m$) of techniques ($A_1 \ldots A_n$), is expected to lead to the highest data utility $U(A_m, D)$ when applied on the entire dataset D. Present techniques allow a data owner to identify, in an efficient accurate manner, the anonymization technique $A_m$ to process the entire dataset D based on the results of category specific sample datasets. In some embodiments, the selected anonymization algorithm $A_m$ may be the optimal algorithm of all the algorithms ($A_1 \ldots A_n$).

According to aspects of the invention, data sampling techniques are provided to generate representative sample datasets (e.g., samplings/subsets of dataset D), wherein each sample dataset is generated based upon a corresponding category of data anonymization technique. The technique achieving the highest data utility may be selected for anonymizing dataset D in its entirety.

The techniques provided herein allow for improved processing, as these techniques accelerate identification of an optimal data anonymization technique. Rather than processing the entire data D with each anonymization technique to determine which technique is optimal with respect to data utility, thereby incurring a significant computational cost as processing of such data may take days or weeks to complete, a plurality of sample datasets, each covering a particular category of anonymization techniques among those available for performing the comparison, are generated and used in place of the entire data D. Each sample dataset, covering a category of anonymization techniques, which is smaller in size than the entire data D, may be processed by a plurality of data anonymization techniques that belong to this category, in a fraction of the amount of time needed to process the entire data D.

Figure 1:
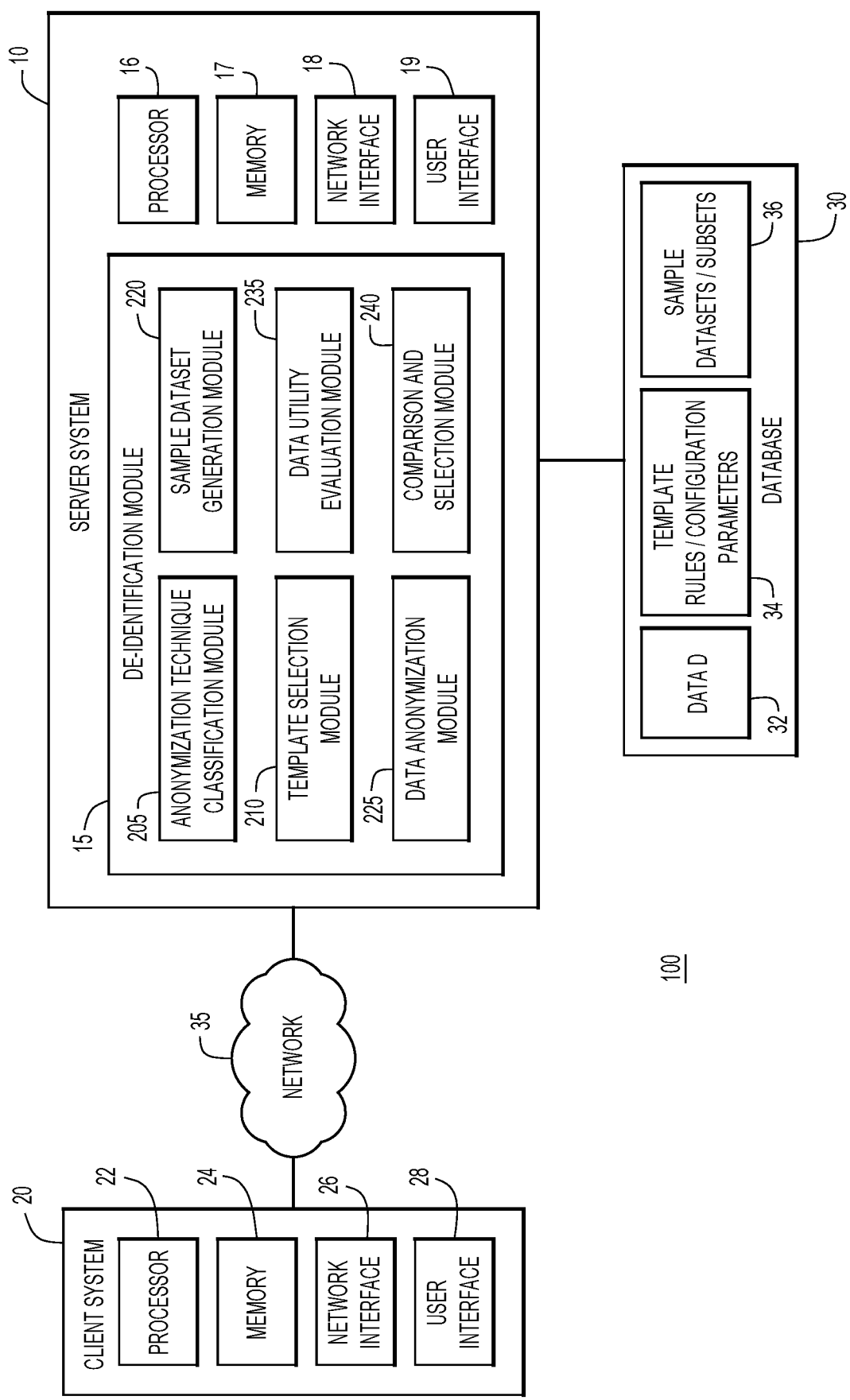
FIG. 1 is a block diagram of an example computing environment for evaluating data de-identification techniques using sample datasets, according to embodiments of the invention.

An example environment for use with present invention embodiments is illustrated in FIG. 1. Specifically, the environment includes one or more server systems 10 and one or more client or end-user systems 20. Server systems 10 and client systems 20 may be remote from each other and communicate over a network 35. The network may be implemented by any number of any suitable communications media (e.g., wide area network (WAN), local area network (LAN), Internet, Intranet, etc.). Alternatively, server systems 10 and client systems 20 may be local to each other, and communicate via any appropriate local communication medium (e.g., local area network (LAN), hardwire, wireless link, Intranet, etc.).

Client systems 20 enable users to submit queries to server systems 10 to determine information pertaining to the queries, wherein the information may contain personally identifying information. The server systems may include a de-identification module 15 to anonymize the data. Anonymization technique classification module 205 may classify data anonymization techniques into one of a plurality of categories (e.g., clustering algorithms, partitioning algorithms, etc.), based on the way that these techniques operate on the data in order to anonymize them. Template selection module 210 may select a template for each anonymization category, which is provided to sample dataset generation module 220. Sample dataset generation module 220 may apply the rules of the template to generate a sample dataset from data D that is specific to a category of anonymization techniques. This sample dataset may be processed by the data anonymization module 225 by a corresponding data anonymization technique of the same anonymization category as the template. Data utility evaluation module 235 computes data utility metrics for the various anonymization techniques, and comparison and selection module 240 determines which anonymization technique provides optimal data utility while being able to process the data in a short period of time. In some aspects, the anonymization techniques may be executed in parallel and are given a time threshold in order to finish their execution. Only those anonymization techniques that finish their execution within the time threshold are considered for determining the anonymization technique to be applied on the dataset D.

A database system 30 may store various information for the analysis (e.g., data D 32, template rules 34, sample datasets 36, etc.). The database system may be implemented by any conventional or other database or storage unit, may be local to or remote from server systems 10 and client systems 20, and may communicate via any appropriate communication medium (e.g., local area network (LAN), wide area network (WAN), Internet, hardwire, wireless link, Intranet, etc.). The client systems may present a graphical user (e.g., GUI, etc.) or other interface 28 (e.g., command line prompts, menu screens, etc.) to solicit information from users pertaining to the desired documents and analysis, and may provide reports including analysis results (e.g., data utility analytics, optimal anonymization techniques, anonymized data, etc.). The server systems 10 may also include a graphical user (e.g., GUI, etc.) or other interface 19 (e.g., command line prompts, menu screens, etc.) to directly interface with a user, pertaining to configuring the de-identification module 15 and providing results (e.g., data utility analytics, optimal anonymization techniques, anonymized data, etc.).

Server systems 10 and client systems 20, respectfully, may be implemented by any conventional or other computer systems preferably equipped with a display or monitor, a base (e.g., including at least one processor 16, 22, one or more memories 17, 24, and/or internal or external network interfaces or communications devices 18, 26 (e.g., modem, network cards, etc.)), optional input devices (e.g., a keyboard, mouse or other input device), and any commercially available and custom software (e.g., server/communications software, de-identification module 15, browser/interface software, etc.).

Alternatively, one or more client systems 20 may analyze datasets to de-identify data when operating as a stand-alone unit. In a stand-alone mode of operation, the client system stores or has access to the data (e.g., data D 32), and includes de-identification module 15 to determine an optimal anonymization technique to anonymize data. The graphical user (e.g., GUI, etc.) or other interface (e.g., command line prompts, menu screens, etc.) solicits information from a corresponding user pertaining to the desired data and analysis, and may provide reports including analysis results to the user.

De-identification module 15 may include one or more modules or units to perform the various functions of present invention embodiments described throughout the application. The various modules (e.g., de-identification module 15, including anonymization technique classification module 205, template selection module 210, sample dataset generation module 220, data utility evaluation module 235, and data anonymization module 240, etc.) may be implemented by any combination of any quantity of software and/or hardware modules or units, and may reside within memory 17 of the server systems for execution by processor 16.

Although a client server relationship has been depicted, this example embodiment is intended to be non-limiting. For example, the techniques provided herein may also be performed in a distributed computing environment and tasks may be run in parallel (e.g., present techniques may operate on any number of machines in parallel, in a distributed computing environment, such as a Hadoop environment, a parallel processing environment, etc.) in order to be more efficient, or such techniques may be performed in a single computer system.

Figure 2A:
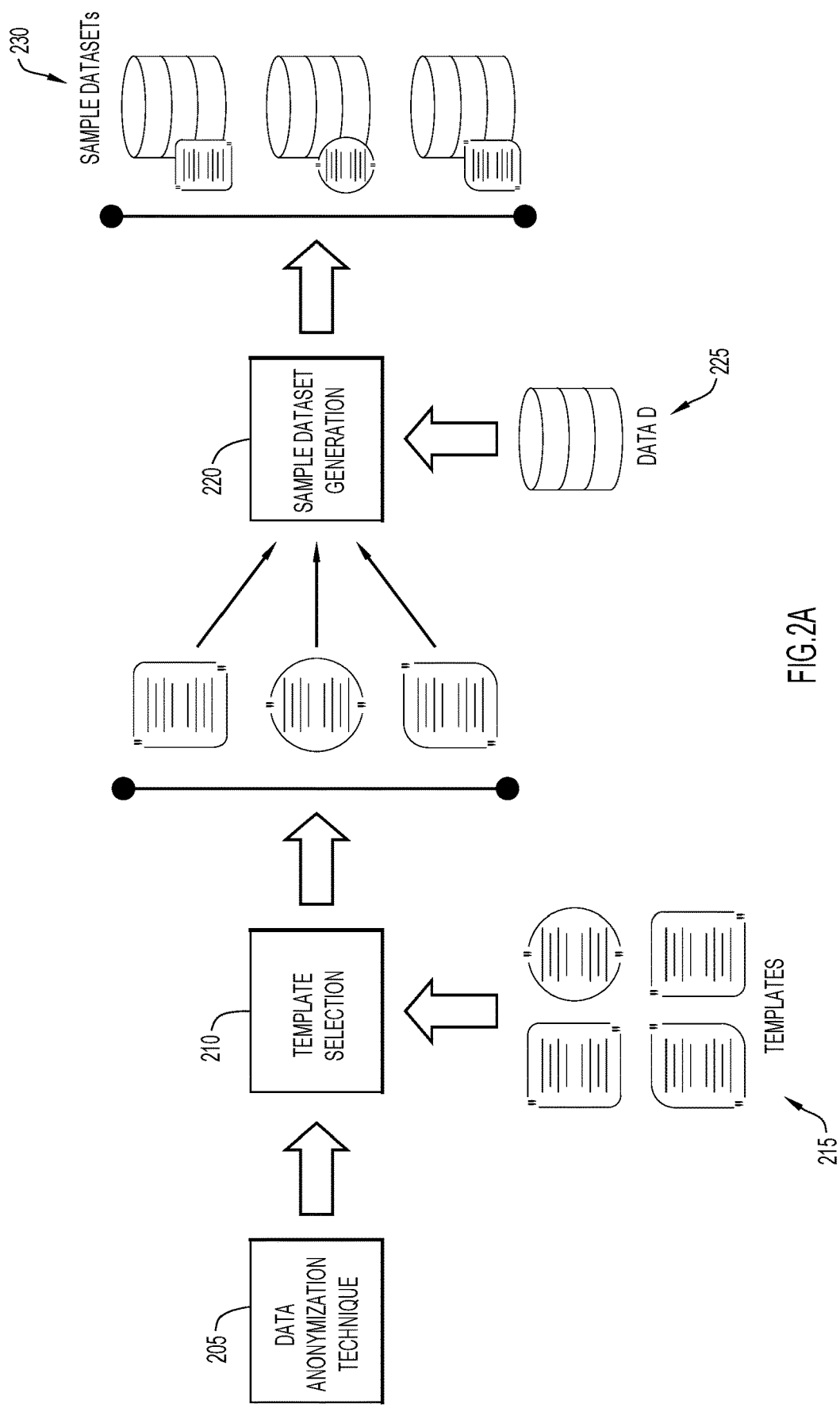
FIGS. 2A-2B are illustrations of a workflow showing selection of optimal anonymization techniques for data de-identification, according to embodiments of the invention.
Figure 2B:
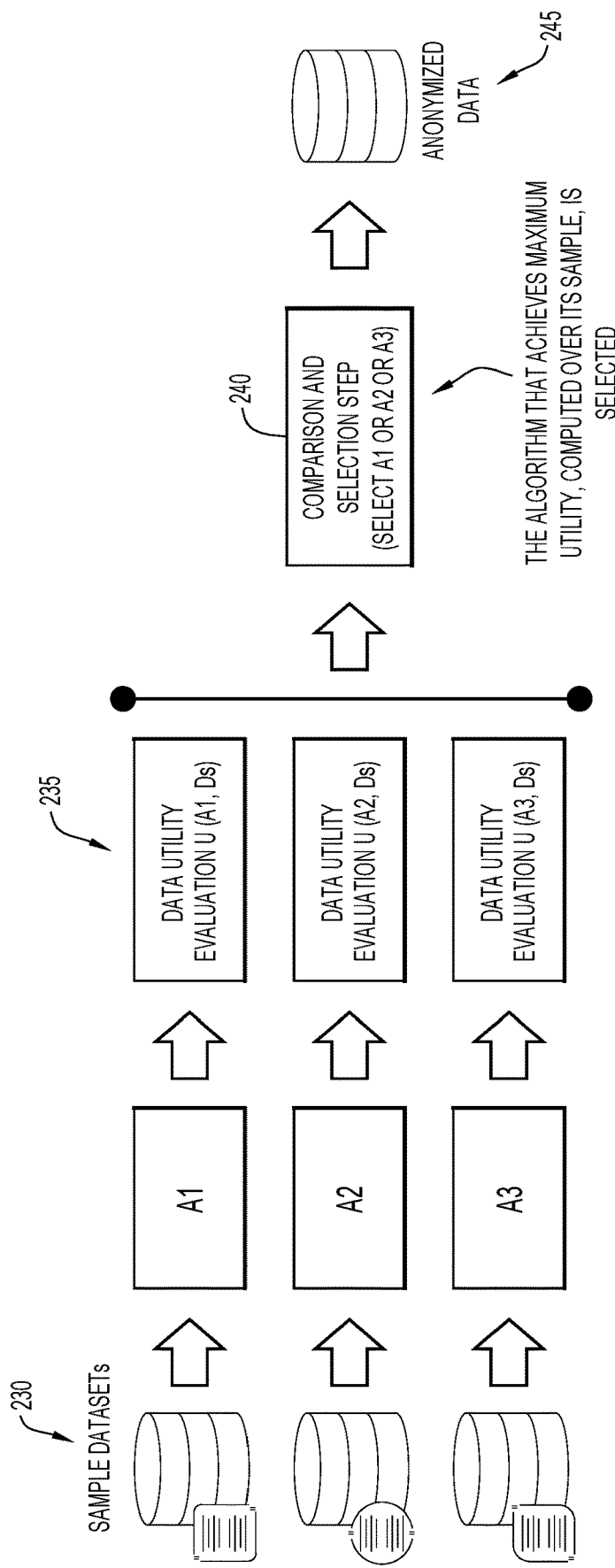

FIGS. 2A-2B show illustrations of a workflow showing selection of an optimal data utility-preserving anonymization technique for data de-identification, according to embodiments of the invention.

Given a dataset D to be anonymized to support a workload W, a system needs to generate a sample dataset for each category of anonymization techniques, perform anonymization on the corresponding sample dataset by each anonymization technique, and determine the data utility $U(A_i)$ achieved by each technique $A_i$ on sample dataset. An optimal anonymization technique may be selected that achieves the best data utility.

A plurality of data anonymization techniques 205 are provided, wherein each technique is capable of de-identifying data following the same formal privacy model. Each data anonymization technique is assigned to an anonymization category, wherein each anonymization category has an associated template 215.

Template selection module 210 may select a particular template 215 for each data anonymization category to be evaluated. A template 215 may comprise rules, specific to the anonymization category, to generate a sample dataset from the input dataset D for analysis by one or more data anonymization techniques of the respective anonymization category. Thus, different sample datasets may be generated for different anonymization categories, and one or more anonymization techniques of the same anonymization category may be applied to the respective sample dataset. Examples of different sample datasets are provided in FIG. 3.

Sample dataset generation module 220 utilizes selected templates 215 to generate a plurality of sample datasets 230, wherein each sample dataset is a subset of dataset D 225. The data from dataset D 32 selected for inclusion within the sample dataset is determined by the template, which includes rules for selecting data based upon the respective anonymization category. In some aspects, one sample dataset per template (i.e. per category of data anonymization techniques) is generated. In some aspects, all anonymization algorithms that fall within the same anonymization category may be evaluated using the same sample dataset.

Referring to FIG. 2B, each sample dataset 230 is processed by one or more anonymization techniques. In some aspects, each anonymization technique in an anonymization category may process the same corresponding sample dataset for that anonymization category. Data utility evaluation module 235 assesses the performance of the anonymization technique to the sample data by computing metrics to assess data utility, such as information loss metrics and/or workload-aware utility loss metrics. Comparison and selection module 240 compares the metrics from the data utility evaluation module to identify which anonymization techniques of the plurality of anonymization techniques are predicted or expected to be optimal with regard to anonymizing dataset D. Comparison and selection module 240 may be used to identify the anonymization technique, a set of anonymization techniques, or the anonymization category expected to be optimal with regard to anonymizing dataset D.

In some aspects, every anonymization technique of the plurality of anonymization techniques may be evaluated. In other aspects, one or more anonymization techniques from each anonymization category may be evaluated.

Thus, present embodiments allow a plurality of anonymization techniques to be rapidly evaluated with regard to a particular dataset D, to determine which anonymization technique(s) to select. In some aspects, each dataset D may have a different optimal data utility-preserving anonymization technique to de-identify the data, based on data distribution in dataset D and the considered use case or workload.

In other aspects, a plurality of sample datasets may be provided per template. From each anonymization category, the sample dataset that is the most similar to the large dataset that needs to be anonymized may be selected. Based on the available anonymization techniques, the corresponding selected sample datasets of the same categories can be processed, in order to determine the optimal anonymization technique for maintaining data utility for the large dataset.

Figure 3:
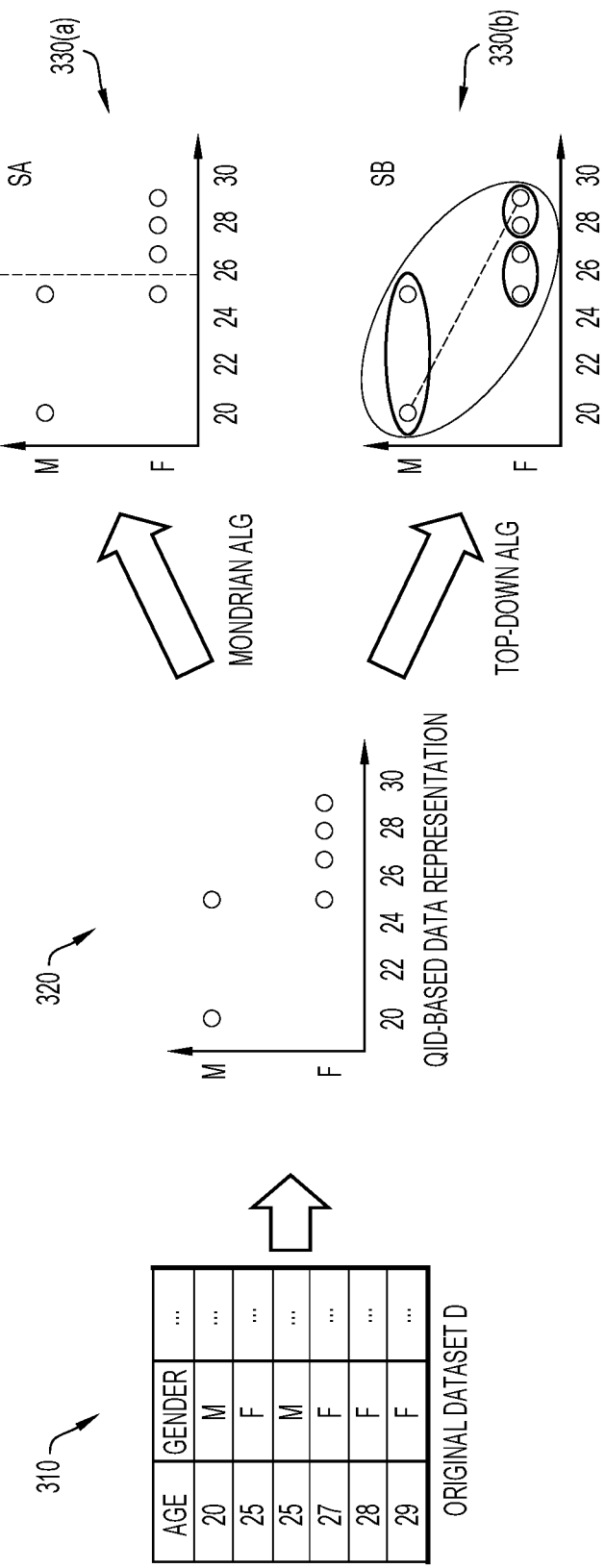
FIG. 3 is an example of anonymization techniques for data de-identification, according to embodiments of the invention.

FIG. 3 shows an example of two different anonymization techniques for data de-identification, according to embodiments of the invention. This example illustrates two particular de-identification algorithms, Mondrian and Top-Down Specialization (TDS). These examples are intended to be non-limiting examples.

In FIG. 3, original relational dataset 310 is shown, listing ages with gender as the quasi-identifying attributes of the dataset. In some aspects, it may be possible to identify an individual (e.g., a male or female of a certain age) based on a combination of these attributes. Thus, anonymization of this data is needed to preserve data privacy. A QID-based representation 320 of the original dataset D 310 is shown, where each individual (corresponding to a row) from dataset D is represented as a two-dimensional point in the plane, with each axis corresponding to a quasi-identifying attribute. Different algorithms may process this data differently, as shown in graphs 330(a)-330(b), in order to anonymize it.

For example, as shown in graph 330(a), an anonymization technique known as the Mondrian algorithm, which applies k-anonymity to a dataset, seeks to recursively partition the data into two sets/subspaces with each subspace containing the same number of data points. This algorithm operates by selecting the quasi-identifying attribute that has the largest domain (e.g., in terms of unique values) as compared to the other attribute(s) in order to partition the data. When the dataset is split based on the attribute, each corresponding subspace is considered as a new attribute within the corresponding domain. The Mondrian algorithm stops recursion, when new splits would lead to a partition that contains less than k records (individuals), where k is the value of anonymity. In this example, the attribute of age has a larger domain than gender which only has two unique values, and therefore, age is selected. Once the data is split or partitioned, the anonymization technique may determine whether further partitions may be performed. In this example, the left partition has three data points and the right partition also has three data points. Further partitioning would result in a subspace/sub-partitions with fewer data points/records than the number of k data points, which is not a valid solution. Thus, the partitioning will stop when the records cannot be split in such a way that each partition has at least k data points. Thus, in this case, the solution is an abstraction of the data, with the left block abstracted as ages 20-26 and with the gender abstracted to "*" to refer to any gender. The right partition is abstracted to ages 27-29 with the gender as female.

In another example, as shown in graph 330(b), an anonymization technique known as Top-Down Specialization (TDS) algorithm is shown, which also applies the k-anonymity privacy model to the data. Unlike Mondrian, the TDS algorithm performs a top-down (divisive) clustering of the data, starting from an all-inclusive cluster that contains all records and at each point splitting this cluster into two sub-clusters, based on clustering analysis. Specifically, TDS computes the points that are farthest apart (i.e. most dissimilar based on a similarity metric) in the cluster and uses these points as seeds to create a cluster around each of them, by selecting other points that are closest to each seed. The same divisive process is repeated recursively for each of these sub-clusters, until a cluster cannot be further split without leading to a sub-cluster that contains less than k points. In this example, at the start of processing, data points with ages 20 and 29 are selected as the two data points that are farthest apart, and two clusters may be initially formed: a top cluster with 2 data points, and a lower cluster with 4 data points. The lower cluster may be further split into additional clusters, as each resulting cluster will have at least k data points. At this point, the algorithm halts, as further divisions would result in a sub-cluster with fewer data points/records than the number of k data points, and therefore, would not be a valid solution. In this example, clustering results in forming three groups of two records each, and each group may be generalized based on the data that it contains.

Both of these examples illustrate anonymization techniques to anonymize data using k-anonymity. As illustrated in FIG. 3, these techniques operate on data in fundamentally different ways, e.g., data partitioning versus data clustering, and therefore, the resultant sample data generated with respect to these categories are highly different data. For some applications and datasets, one anonymization technique may be preferred over another. It may be that for some queries, the Mondrian algorithm is preferred over TDS for anonymizing a particular dataset, as it allows for more accurate answers to such queries. Further, each algorithm may produce anonymized data of a different data utility. Thus, these example anonymization techniques illustrate that data may be processed in a variety of ways based on a variety of anonymization algorithms, and that some anonymization techniques may achieve better data utility than other algorithms for specific workloads, which is determined at least in part on the attribute values of the data.

To assess different anonymization techniques in a short period of time, sample datasets may be generated that are subsets of data D 32, with fewer records/data points than the full dataset. The data points of the sample datasets are selected such that the anonymization techniques will make the same decisions or substantially the same decisions with regard to partitioning the data, regardless of whether the sample dataset or full dataset is processed. The full dataset should be processed based on the same decisions or substantially the same decisions as the sample dataset. Accordingly, the sample datasets account for differences in partitioning of data with different anonymization techniques, while preserving characteristics of the dataset such that the sample data will generate the same decisions by the anonymization technique as the entire dataset D.

For other categories of de-identification algorithms, different templates may be generated to produce different sample datasets. In some aspects, the templates may utilize rules to predict, estimate or calculate, the position of one or more dividing elements and may select points along the dividing element in order to create a sample dataset. A dividing element may be a line, a polygon, a circle, an oval, or any other element that can divide a data space into two parts. In general, the template may contain rules, capable of being executed in a short amount of time, which select data points to be representative of the entire data D with respect to an anonymization category.

Figure 4:
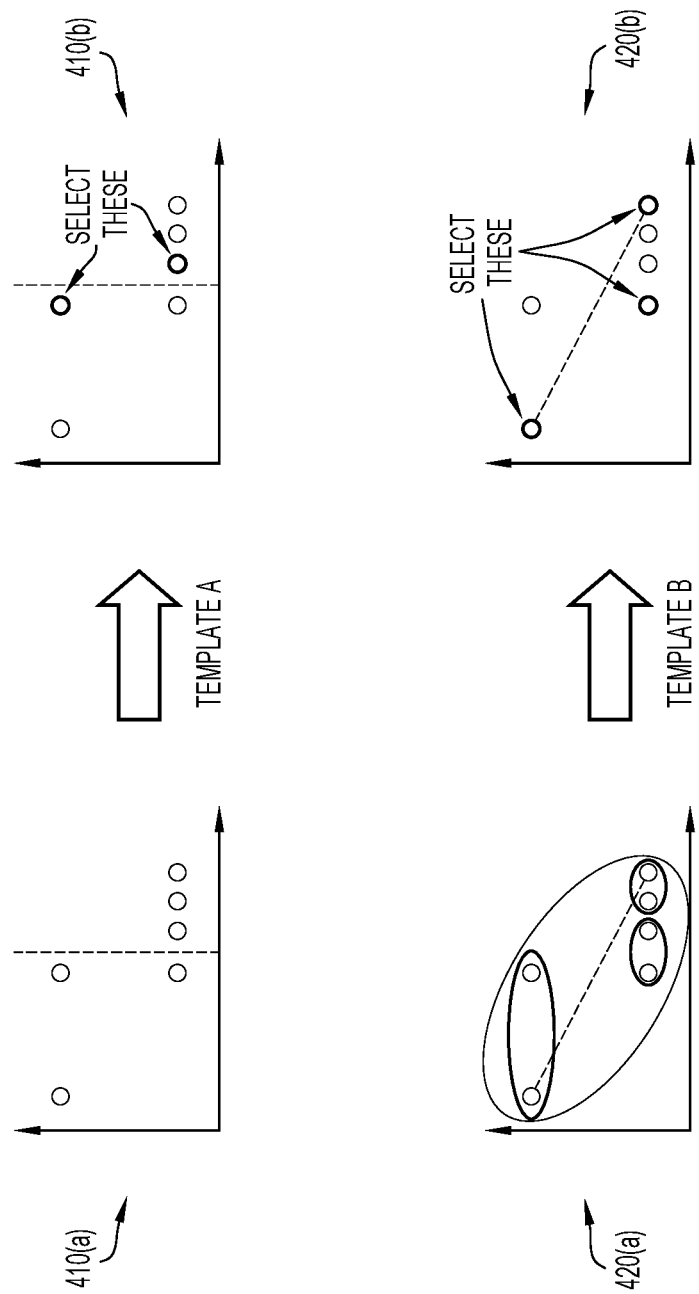
FIG. 4 shows example templates for generating sample datasets to be evaluated for utility corresponding to particular anonymization categories, according to embodiments of the invention.

FIG. 4 shows example templates for generating sample datasets to be evaluated with regard to a particular anonymization technique, according to embodiments of the invention. These examples utilize two particular anonymization techniques, e.g., the Mondrian algorithm or the TDS algorithm, and are intended to be non-limiting examples. For other categories of anonymization techniques, different templates may be generated to produce different sample datasets.

FIG. 4, graph 410(a) shows partitioning using the Mondrian algorithm of a dataset into two regions, Region A and Region B. Accordingly, when the Mondrian template is applied, data points on opposite sides of the partition are selected for inclusion within the sample dataset as shown in FIG. 4, graph 410(b). For Mondrian or other partitioning approaches, the template may include rules for determining the position of the partitioning element, and data points that are closest to the partitioning element (e.g., a separating line or plane, etc.), may be selected for inclusion into the sample data set. Thus, by selecting these two points, the sample dataset mimics the partitioning of the full dataset D.

FIG. 4, graph 420(a) shows clustering of a dataset using TDS. For TDS, data to be retained include the points that are the furthest apart, as distance is a significant factor in clustering analysis. FIG. 4, graph 420(b) shows selection of three points to include in the sample dataset. For example, the template rules will select the data points that are furthest apart (points connected by the dashed line), and two initial clusters may be formed. The process may be repeated, with each cluster evaluated for additional divisions. In this example, the lower cluster can be further divided and still form a valid solution, however the upper cluster cannot be further divided and form a valid solution. Therefore, with regard to the lower cluster, an additional division may be performed, and the points that are furthest apart with respect to this division are selected for inclusion into the sample dataset.

This process may be used to generate other templates, specific to other data anonymization categories in order to build other sample datasets for analysis. Sample datasets (subsets) can be used to identify an optimal anonymization technique, and based on evaluating the level of data utility, the anonymization techniques that perform the best on the entire dataset D can be identified.

It is noted that after sampling is performed on dataset D, the level of anonymization of the sample dataset will need to be reduced based on the selection process that was followed by the sampling procedure and the number of selected records from the dataset. Assuming that k-anonymity is the privacy model applied by the anonymization algorithms, k'-anonymity (where k'<<k) will need to be applied by the same algorithms on the respective samples to allow for their comparison in terms of utility preservation.

Figure 5:
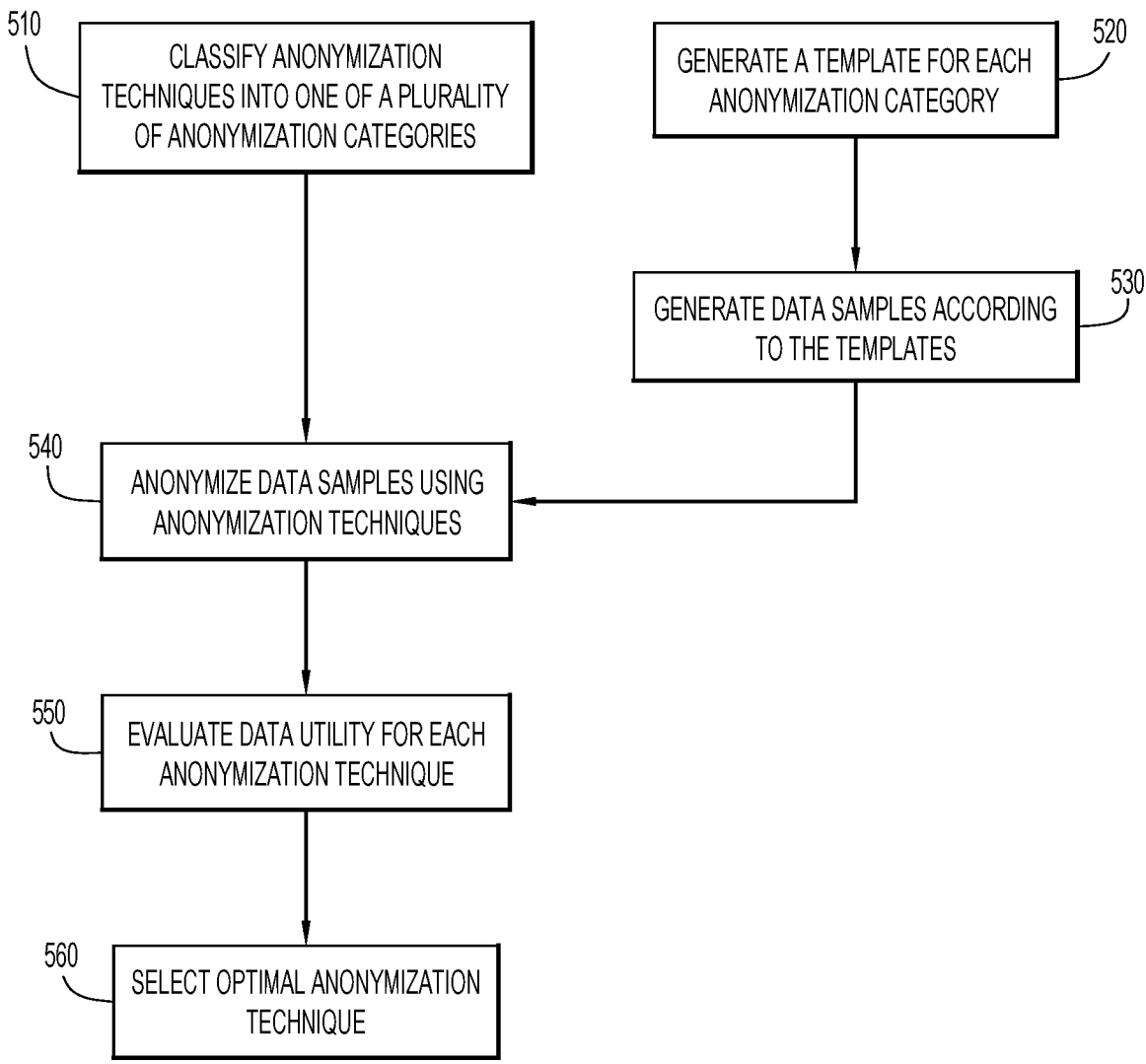
FIG. 5 is an example flowchart showing operations for selecting anonymization techniques for data de-identification, according to embodiments of the invention.

FIG. 5 is an example flowchart showing operations for selecting optimal data utility-preserving anonymization techniques for data de-identification, according to embodiments of the invention. At operation 510, anonymization techniques are classified into one of a plurality of anonymization categories. At operation 520, templates are generated for each anonymization category. At operation 530, data samples are generated according to rules of the corresponding templates. At operation 540, samples of data are anonymized using anonymization techniques from the anonymization category in which the sample belongs. At operation 550, data utility is evaluated for each anonymization technique based on the corresponding anonymized sample. At operation 560, optimal anonymization technique(s) are selected based on the data utility metrics. In some aspects, a score may be generated reflecting the data utility, and the optimal anonymization technique(s) may be selected based on the score. In other aspects, machine learning models may be used to select optimal anonymization techniques based on data utility metrics.

Figure 6:
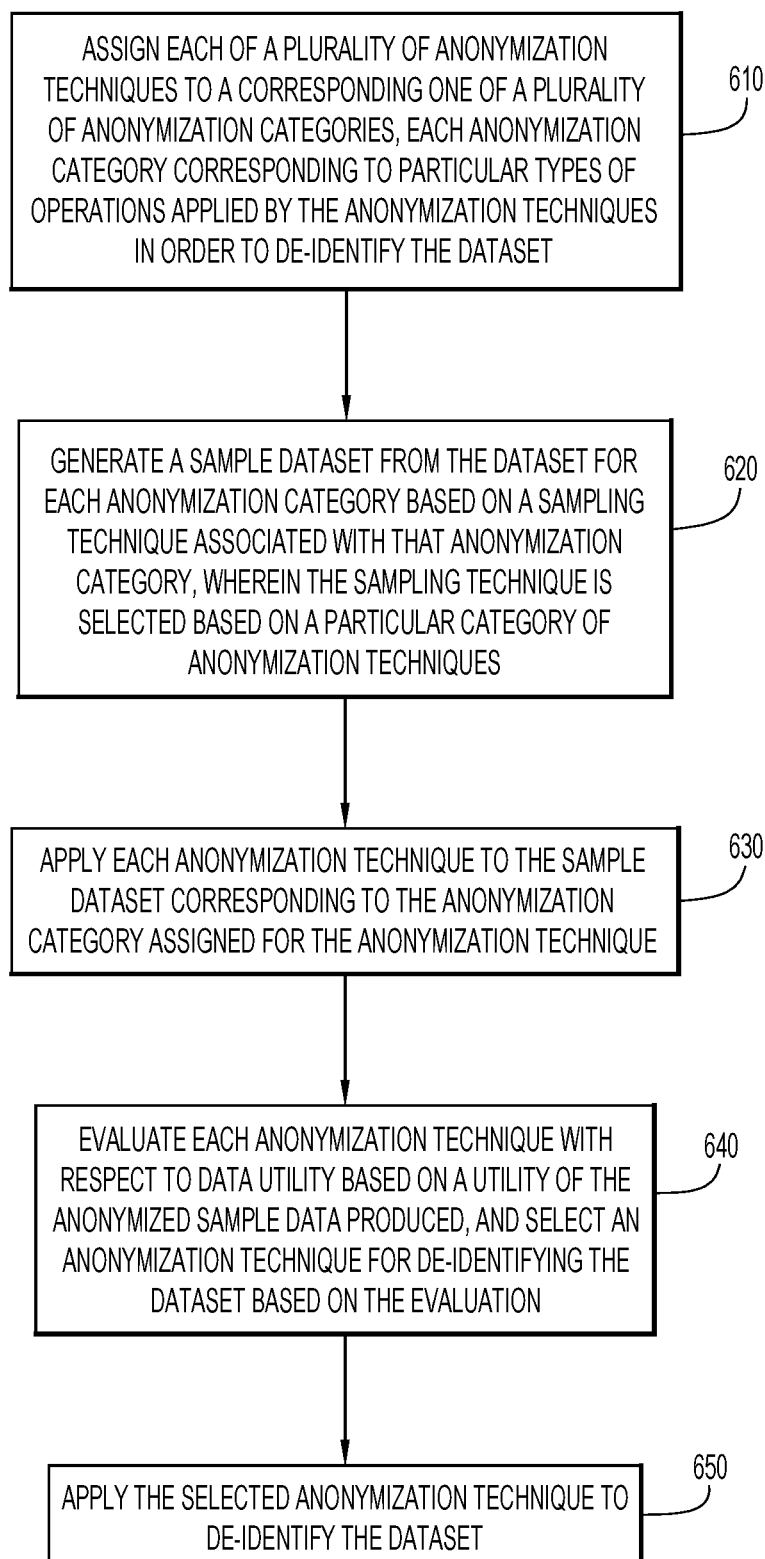
FIG. 6 is another example flowchart showing operations at a high level for selecting techniques for data de-identification, according to embodiments of the invention.

FIG. 6 is another example flowchart showing operations for selecting optimal data utility-preserving anonymization techniques for data de-identification at a high level, according to embodiments of the invention. At operation 610, each of a plurality of anonymization techniques is assigned to a corresponding one of a plurality of anonymization categories, each anonymization category corresponding to particular types of operations applied by the anonymization techniques in order to de-identify the dataset. At operation 620, a sample dataset is generated from the dataset for each anonymization category based on a sampling technique associated with that anonymization category, wherein the sampling technique is selected based on a particular category of anonymization techniques. At operation 630, each anonymization technique is applied to the sample dataset corresponding to the anonymization category assigned for the anonymization technique. At operation 640, each anonymization technique is evaluated with respect to data utility based on a utility of the anonymized sample data produced, and an anonymization technique is selected for de-identifying the dataset based on the evaluation. At operation 650, the selected anonymization technique is applied to de-identify the dataset.

Advantages of present invention embodiments include computational efficiency for determining an optimal anonymization technique, broad usage as the sample datasets can be used to determine data utility for any technique in a given anonymization category, and identification of techniques that provide maximum data utility while being sufficiently privacy-protecting and selected for application on the entire data D. Accordingly, rather than processing each algorithm on the entire data D 32, which may be time consuming, and may take days or weeks to produce a result, the techniques provided herein accelerate this process by utilizing templates to generate sample datasets for each anonymization category. The sample datasets are much smaller in size than the entire data, but retain properties of the entire data such that the sample dataset and entire data are processed by a respective anonymization technique in a same or a similar manner. Accordingly, as the sample datasets are smaller in size, processing may occur on a faster timescale, and determination of optimal data utility can occur much more quickly and efficiently. Accordingly, the techniques provided herein rely on generation of sample datasets (using templates) corresponding to an anonymization category, and the sample datasets are processed by one or more anonymization techniques and analyzed.

Present techniques provide an efficient solution for identifying the best data anonymization technique (among a number of anonymization techniques), and its associated configuration options, given data D and a supported workload. These techniques allow for data de-identification to be assessed with sample datasets in order to efficiently select an anonymization technique to generate anonymized data D that retains maximum data utility while being sufficiently privacy-protected.

Additionally, the present techniques may be used to support machine learning tasks, for example, in this case, data may be sampled in a manner that would support machine learning tasks—e.g., the sample dataset may lead to the same machine learning model as the entire dataset D.

In other aspects, the present techniques may be used to accelerate machine learning computations. For example, for machine learning computations operating on anonymized data, the machine learning computation may be performed using the sample dataset, rather than the entire data, thereby accelerating the machine learning process while maintaining accuracy.

Accordingly, applying one data sampling technique per category of data, allows the meaningful comparison of all anonymization techniques on the same dataset D. Thus, data D may be sampled in different ways, leading to a sample dataset for each anonymization category that is applicable to a particular category of anonymization technique and allows a fair comparison across all anonymization techniques ($A_1 \ldots A_n$) as these anonymization techniques are expected to belong in different categories in terms of their operation—e.g., data clustering vs. data partitioning algorithms.

It will be appreciated that the embodiments described above and illustrated in the drawings represent only a few of the many ways of implementing embodiments for de-identification of data. The techniques provided herein may be applied to datasets from any industry, including healthcare, telecommunications, retail, etc. Present techniques allow for data to be sufficiently anonymized while retaining high data utility, and may be integrated with or interface with any application or service offering data privacy, data masking, or data anonymization products.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, software for de-identification module 15, etc.). These systems may include any types of monitors and input devices (e.g., keyboard, mouse, voice recognition, etc.) to enter and/or view information.

It is to be understood that the software (e.g., de-identification module 15, including anonymization technique classification module 205, template selection module 210, sample dataset generation module 220, data utility evaluation module 235, and data anonymization module 240, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., de-identification module 15, including anonymization technique classification module 205, template selection module 210, sample dataset generation module 220, data utility evaluation module 235, and data anonymization module 240, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., datasets, sample datasets, templates, classification data, data utility metrics, etc.). The database system may be implemented by any number of any conventional or other databases, data stores or storage structures (e.g., files, databases, data structures, data or other repositories, etc.) to store information (e.g., data D 32, sample datasets 36, data utility metrics, anonymization techniques, template rules 34, etc.). The database system may be included within or coupled to the server and/or client systems. The database systems and/or storage structures may be remote from or local to the computer or other processing systems, and may store any desired data (e.g., data D 32, sample datasets 36, data utility metrics, anonymization techniques, template rules 34, etc.).

The present invention embodiments may employ any number of any type of user interface (e.g., Graphical User Interface (GUI), command-line, prompt, etc.) for obtaining or providing information (e.g., data D 32, sample datasets 36, data utility metrics, anonymization techniques, template rules 34, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The results may include any information arranged in any fashion, and may be configurable based on rules or other criteria to provide desired information to a user (e.g., data D 32, sample datasets 36, data utility metrics, anonymization techniques, template rules 34, etc.).

The present invention embodiments are not limited to the specific tasks or algorithms described above, but may be utilized for any application in which data privacy is a concern.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, in a de-identification system comprising at least one processor and at least one memory, the at least one memory comprising instructions executed by the at least one processor to cause the at least one processor to implement the de-identification system for predicting and applying an optimal de-identification technique to de-identify a dataset comprising:

assigning each of a plurality of anonymization techniques to a corresponding one of a plurality of anonymization categories, each anonymization category corresponding to particular types of operations applied by the anonymization techniques in order to de-identify the dataset;

generating a sample dataset from the dataset for each anonymization category based on a sampling technique associated with that anonymization category, wherein the sampling technique is selected based on a particular category of anonymization techniques, and wherein the sample dataset is different for at least two of the anonymization categories;

applying each anonymization technique to the sample dataset corresponding to the anonymization category assigned for the anonymization technique;

evaluating each anonymization technique with respect to data utility based on a utility of the anonymized sample data produced, and selecting an anonymization technique for de-identifying the dataset based on the evaluation; and applying the selected anonymization technique to de-identify the dataset.

2. The method of claim 1, wherein selecting an anonymization technique comprises:

selecting an anonymization technique achieving maximum data utility over the corresponding sample dataset.

3. The method of claim 1, wherein data utility is measured utilizing information loss metrics indicating overall distortion introduced to data to achieve de-identification.

4. The method of claim 1, wherein data utility is measured utilizing workload-aware utility loss metrics, indicating how well de-identified data can be used to support a particular workload relative to how a same workload is supported by original data.

5. The method of claim 1, wherein data utility is measured based on a plurality of utility metrics, and wherein the anonymization technique is selected based on its performance with regard to a majority of the utility metrics.

6. The method of claim 1, wherein the anonymization techniques are executed on the sample dataset in parallel and are given a time threshold in order to finish their execution, and wherein only those anonymization techniques that finish their execution within the time threshold are considered for determining the anonymization technique to be applied on the dataset.

7. The method of claim 1, wherein at least one anonymization technique clusters data or partitions data.

8. The method of claim 1, wherein different configurations of at least one data anonymization technique are evaluated with respect to data utility on the sample data, to allow selection of the anonymization technique for de-identifying the dataset based on the evaluation.

9. The method of claim 1, wherein a template is utilized to generate the sample dataset, such that the anonymization technique generates same decisions or substantially same decisions regardless of whether the anonymization technique is applied to the entire dataset or to the sample dataset.

10. The method of claim 1, wherein a plurality of sample datasets are provided per template and the sample dataset of each anonymization category that is most similar to the dataset to be anonymized is selected to allow evaluating the utility of the anonymization techniques of this category.

* * * * *